United States Patent
Nummila-Pakarinen et al.

(10) Patent No.: US 11,097,305 B2
(45) Date of Patent: Aug. 24, 2021

(54) EXTRUSION COATING OF LOW DENSITY POLYETHYLENE AND HEAT-SEALED ARTICLE MADE THEREFROM

(71) Applicant: Borealis AG, Vienna (AT)

(72) Inventors: Auli Nummila-Pakarinen, Porvoo (FI); Mikko Peltovuori, Kotka (FI); Mattias Bergqvist, Gothenburg (SE)

(73) Assignee: BOREALIS AG, Vienna (AT)

( * ) Notice: Subject to any disclaimer, the term of this patent is extended or adjusted under 35 U.S.C. 154(b) by 103 days.

(21) Appl. No.: 15/100,893

(22) PCT Filed: Dec. 17, 2014

(86) PCT No.: PCT/EP2014/078274
§ 371 (c)(1),
(2) Date: Jun. 1, 2016

(87) PCT Pub. No.: WO2015/091676
PCT Pub. Date: Jun. 25, 2015

(65) Prior Publication Data
US 2016/0296965 A1 Oct. 13, 2016

(30) Foreign Application Priority Data

Dec. 19, 2013 (EP) .................................... 13198650

(51) Int. Cl.
*B27B 27/00* (2006.01)
*B27B 27/10* (2006.01)
(Continued)

(52) U.S. Cl.
CPC .............. *B05D 1/265* (2013.01); *B32B 15/08* (2013.01); *B32B 15/20* (2013.01); *B32B 27/08* (2013.01);
(Continued)

(58) Field of Classification Search
CPC ......... B32B 15/08; B32B 27/08; B32B 27/10; B32B 27/12; B32B 27/32; B32C 47/00; B32C 47/06
See application file for complete search history.

(56) References Cited

U.S. PATENT DOCUMENTS 4,359,553 A * 11/1982 Edwards ................. C09J 123/06
525/240
4,701,360 A * 10/1987 Gibbons ................. B32B 27/10
428/34.2
(Continued)

FOREIGN PATENT DOCUMENTS

CN 102333632 A 1/2012
EA 015960 B1 1/2012
(Continued)

OTHER PUBLICATIONS

Busico, Vincenzo, et al., "1H NMR Analysis of Chain Unsaturations in Ethene/1-Octene Copolymers Prepared with Metallocene Catalysts at High Temperature", Macromolecules 2005, 38, 6988-6996.
(Continued)

*Primary Examiner* — Michael L Leonard
(74) *Attorney, Agent, or Firm* — Tarolli, Sundheim, Covell & Tummino LLP

(57) ABSTRACT

The present invention relates to the use of a at least a part of a polymer layer comprising a composition (Co), the composition comprising a low density polyethylene (LDPE) produced in a tubular reactor which composition is free of additives as a thermoplastic surface of an extrusion coated structure comprising the polymer layer and a first substrate for preparing heat-sealed articles by heat-sealing of said thermoplastic surface with a second substrate; and The use of a at least a part of a polymer layer comprising a composition (Co), the composition comprising a low density polyethylene (LDPE) having
(Continued)

a melt flow rate (MFR) according to ISO 1133 (190° C., 2.16 kg) higher than 3.0 g/10 min;

a molecular weight distribution Mw/Mn which is greater than 10; and a vinylidene content which is at least 15/100 k C; which composition is free of additives as a thermoplastic surface of an extrusion coated structure comprising the polymer layer and a first substrate for preparing heat-sealed articles by heat-sealing of said thermoplastic surface with a second substrate.

3 Claims, 3 Drawing Sheets

(51) Int. Cl.
| | |
|---|---|
| B05D 1/26 | (2006.01) |
| B32B 15/08 | (2006.01) |
| B32B 27/12 | (2006.01) |
| B32B 27/08 | (2006.01) |
| B32B 27/36 | (2006.01) |
| B32B 27/32 | (2006.01) |
| B32B 27/10 | (2006.01) |
| B32B 27/34 | (2006.01) |
| B32B 15/20 | (2006.01) |
| C09D 123/06 | (2006.01) |

(52) U.S. Cl.
CPC .............. *B32B 27/10* (2013.01); *B32B 27/12* (2013.01); *B32B 27/32* (2013.01); *B32B 27/34* (2013.01); *B32B 27/36* (2013.01); *C09D 123/06* (2013.01); *B32B 2307/31* (2013.01); *B32B 2307/518* (2013.01); *B32B 2581/00* (2013.01)

(56) References Cited

U.S. PATENT DOCUMENTS

| 5,536,542 | A * | 7/1996 | Gillespie | B29C 66/71 |
| | | | | 428/34.3 |
| 6,521,734 | B1 * | 2/2003 | Araki | B32B 27/32 |
| | | | | 526/227 |
| 2003/0055191 | A1 * | 3/2003 | Yasaka | B32B 7/12 |
| | | | | 526/348.6 |
| 2007/0225445 | A1 | 9/2007 | Nguyen | |

FOREIGN PATENT DOCUMENTS

| EP | 1118459 A1 | 7/2001 |
| WO | 2008031540 A2 | 3/2008 |
| WO | 2013083285 A1 | 6/2013 |
| WO | 2013178241 A1 | 12/2013 |
| WO | 2013178242 A1 | 12/2013 |
| WO | 2016/023993 A1 | 2/2016 |

OTHER PUBLICATIONS

Jackson, Christian, "Molecular Weight-Sensitive Detectors for Size Exclusion Chromatography" Handbook of size exclusion chromatography:103-145 1995.
Raff, R.A.V., et al., "Crystalline Olefin Polymers", Interscience Publishers, 1964, pp. 478-484.
He, Yiyong, et al., "Unexpected proton spin-lattice relaxation in the solutions of polyolefin and tetrachloroethane", Magnetic Resonance in Chemistry, 2010, 48, 537-542.
Heino, Eeva-Leena, "The influence of molecular structure on some rheological properties of polyethylene", Annual Transactions of the Nordic Rheology Society, vol. 3, 1995.
Heino, Eeva-Leena, et al., "Rheological Characterization of Polyethylene Fractions", Theoretical and Applied Rheology, Aug. 17-21, 1992.
Rosato, Dominck, Plastics Processing Data Handbook, Chapman & Hall 1997, pp. 273-277.
Kaye, A., et al., "Definition of Terms relating to the Non-Ultimate Mechanical Properties of Polymers", Pur & Appl. Chem., vol. 70, No. 3, pp. 701-754, 1998.
"Polyethylene CT7200", Oct. 17, 2013, pp. 1-3, retrieved from the Internet: http://www.borealisgroup.com/Global/Polyolefins/10/03/30/140033043.pdf.
Bosch, J.J.J.A, "The introduction of tubular LDPE to the extrusion coating market and the specifics of the product", 12th European place conference 2009; Budapest Hungary, May 18-20, 2009, vol. 2, pp. 1036-1063.
Sabic, LDPE nExCoat 5 Low Density Polyethylene for Extrusion Coating, Dec. 27, 2012, retrieved from http://atlantic-polymers.pl.plastics/Idpe/nExCoat5.pdf.
Office Action for Chinese Patent Application No. 201480065747.3, dated Jan. 11, 2017.
Office action for Russian Patent Application No. 2016128127/05.
International Report on Patentability dated Jun. 30, 2016.
"Polyethylene CA7230 Low Density Polyethylene for Extrusion Coating", EC 0313 Aug. 18, 2003 Ed. 5.
"Polyethylene CA7230", Feb. 25, 2014 Ed.1.
"Polyethylene CA82OO Low Density Polyethylene for Extrusion Coating", EC 0314 May 18, 2004 Ed.6.
"Polyethylene CA82OO", Feb. 26, 2014 Ed.1.
Response to the Opposition filed Nov. 21, 2018, by The Dow Chemical Company, dated Mar. 15, 2019.
The Material Guidebook for Converting 2004, Converting Technical Institute 2003, ISBN4-906451-30-6 C3068; pp. 272-275, English translation.
Notice for Opposition for European Patent Application No. 2886338, dated Nov. 21, 2018.
Barry A. Morris, "The Case Against Oxidation As a Primary Factor for Bonding Acid Copolymers to Foil", Antec May 6-10, 2001, pp. 25-35.
Trouble shooting Extrusion Coating, Dow Plastics, 1995.
Sabic LDPE nExCoat 5, technical information sheet, 2010.
Bosch, "The introduction of tubular LDPE to the extrusion coating market and the specifics of the product", 12th Europoean Place Conference 2009: Budapest, Hungary, May 18-20, 2009, TAPPI, vol. 2, May 18, 2009, 1036-1063.
Declaration on NUC-8007 by Dr. Teresa Plumley Karjala, Nov. 18, 2018.
"Stronger Together", Performance Plastics, Analytical Report attached to D5, May 11, 2012.2012.
E-mail of Dr Jian Wang dated May 11, 2012.
Print screens relating to invoice 88072328.
Invoice No. 38/072328, 2011.
Print screens relating to invoice 88072156.
Invoice No. 38/88072156, 2011.
LDPE Product Listing for Extrusion Coating Applications published by NUC before Jun. 2007.
Material Safety Data Sheet for NUC-8007.
Statement of Yuyaka Maehara on Shipment of LDPE NUC-8007, Apr. 18, 2018.
The Material Guidebook for Converting 2004, Converting Technical Institute 2003, ISBN4-906451-30-6 C3068; pp. 272-275.
Office action for India Patent Application No. 201617016340, dated Aug. 13, 2019.
Submission of opponent: The Dow Chemical Company, re: Opposition against European Patent No. 2886338 in the name of Borealis AG, dated Feb. 3, 2020.
Standard test method for Determining Molecular Weight Distribution and Molecular Weight Averages of Polyolefins by High Temperature Gel Permeation Chromatography, ASTM International, May 24, 2006.
Machine Translation for JP 2010095265 A.
Thomas Bezigian, "Extrusion Coating Manual", PLC Technologies Consulting Company, 4th edition, Nov. 1998.

(56) References Cited

OTHER PUBLICATIONS

"Plastics—Determination of average molecular mass and molecular mass distribution of polymers using size exclusion chromatography", International Standard, 1st edition, Apr. 15, 2003.
Invoice No. 38 88072328, Mar. 2, 2011 (English).
Invoice No. 38 88072156, Feb. 22, 2011 (English).
Material Safety Data Sheet for NUC-8007, Dow Chemical Japan Ltd., issued May 3, 2010.
Submission of opponent: The Dow Chemical Company, re: Opposition against European Patent No. 2886338 in the name of Borealis AG, dated Ocotober 28, 2019.
Signed statement of Peter Shimeall on GC-MS and LC Anaylis of LDPE NUC-8007 for Presence of Additives, dated Jan. 30, 2020.
External Test Report No. PIC-CL-0902-1, Public Welfare Institute of Scientific Research General Research Lab, dated Apr. 22, 2019.
External Test Report No. 199031967-001, Analysis Report, Japan Food Research Laboratories, dated Mar. 31, 1999.
Signed statement of Kazuyuki Kogure, Director, Senior Vice President, NUC Corporation, NUC-8007, Jan. 17, 2020.
Letter to EPO Opponent re: Opposition against European Patent No. 2886338, dated May 15, 2020.
Further response by Opponent re: Opposition against European Patent No. 2886338, dated May 14, 2020.

B.H. Gregory, "Extrusion Coating a Process Manual", 2005, Trafford Publishing, Victoria BC, Canada, pp. 73-75.
Shenoy, Ei Al., "Melt Rheology of Polymer Blends from Melt Flow Index", Intern. J. Polymeric Mater. 1984, 10(3), 213-235.
Andersson et al., "Degradation of Polyethylene During Extrusion. II Degradation of Low-Density Polyethylene, Linear LowDensity Polyethylene, and High-Density Polyethylene in Film Extrusion", Journal of Applied Polymer Science 2004, 91(3), 1525-1537.
Sdrobis et al., "Low density polyethylene composites containing cellulose pulp fibers", Composites: Part B 2012,43 (4), 1873-1880.
Certified English translation of Japanese Unexamined Patent Application Publication JP 2010-95265 A.
Certified English translation of Maehara Statement Exhibit, Nippon Unicar Company Limited, LDPE LLDPE for Extrusion Coating Applications.
Anne Emblem and Henry Emblem; "Packaging technology Fundamentals, materials and processes"; Elsevier, Woodhead Publishing; Oct. 29, 2012; (retrieved from: www.knovel.com); 50 pgs.
B. H. Gregory; "Extrusion Coating the Comprehensive Process Manual"; Trafford Publishing; Victoria BC, Canada, Jul. 23, 2010; 7 pgs.
Applicant: Borealis AG; "Opposition against European Patent No. 2886338"; European Office Action; The Hague European Patent Office, dated Oct. 29, 2020; 8 pgs.

\* cited by examiner

EXTRUSION COATING OF LOW DENSITY POLYETHYLENE AND HEAT-SEALED ARTICLE MADE THEREFROM

The present invention is directed to a heat sealed article comprising a polymer layer extrusion coated on a substrate wherein the polymer layer comprises a composition comprising a low density polyethylene whereby the composition does not comprise any additives, to a process for preparing such an article and the use of a polymer layer comprising such a composition as layer in heat-sealed structures.

Low density polyethylene (LDPE) is used in many applications as for instance in extrusion coating. It is generally known that due to the high processing temperatures used in the extrusion coating process degradation of the low density polyethylene (LDPE) occurs. Main degradation reaction is molecular enlargement, i.e. cross-linking of the polymer takes place at such high temperatures. One disadvantage of such cross-linking is that the melt flow rate of the low density polyethylene (LDPE) drastically drops. These changes are easily detectable by normal melt flow rate measurement. However such low melt flow rates (MFR) are undesired as this limits the draw down speed and polymer penetration into the substrate significantly in the extrusion coating process. Moreover, such crosslinking also negatively influences the sealing performance To avoid cross-linking, antioxidants maybe used as described in WO2013/124221. However, antioxidants typically prevent the oxidation of the polymer melt exiting the die which then negatively affects the adhesion performance of the coating. The reduced adhesion between the coating and the substrate cannot be accepted in an extrusion coating process as it is one of the most important factors in this technology. In WO2013/124221 a specific antioxidant is used trying to cope with this conflict of aims.

In an extrusion coating process a substrate is coated with polymer. The substrate is typically a fibrous substrate, such as paper, paperboard or Kraft paper; a metal foil, such as aluminum foil; or a plastic film, such as a biaxially oriented polypropylene film, polyethylene terephthalate (PET) film, polyamide (PA) film or cellophane film. The polymer is extruded onto the moving substrate through a flat die. The polymer melt exits the die typically at a high temperature, typically between 275 to 330° C.

When the melt exits the die the melt film is pulled down into a nip formed between two rollers, the pressure roll and the chill roll, situated below the die. The substrate, moving at a velocity which is higher than that of the melt film, draws the film to the required thickness. The pressure between the two rolls forces the film onto the substrate. Further, the film is cooled and solidified by the low temperature of the chill roll. The draw-down ratio, which is one of the characteristic parameters of the extrusion coating process, is the ratio of the die gap to the thickness of the polymer film on the substrate.

In a typical extrusion coating process the substrate is passed at a high velocity, typically more than 100 m/min or more than 300 m/min, and in most commercially operating machines more than 400 m/min or more than 500 m/min. Modern machines are designed to operate at lines speeds of up to 1000 m/min. In the instant application "line speed" and "draw-down speed" are considered as synonyms denoting the speed of the substrate in the coating line.

Description of extrusion coating process is given, for instance, in Crystalline Olefin Polymers, Part II, by R. A. V. Raff and K. W. Doak (Interscience Publishers, 1964), pages 478 to 484, or Plastics Processing Data Handbook, by Dominick V. Rosato (Chapman & Hall, 1997), pages 273 to 277.

Such extrusion coated substrates may be used in packaging and other applications wherein heat-sealing is used to join a thermoplastic surface to a substrate. This is done by applying heat to the surfaces to be joined to soften or melt them while applying some pressure to the place where they need to be joined. Most commonly the heating is carried out by contacting the surfaces opposite those to be joined with a hot object, such as a hot bar or heating the surfaces with hot air, infra-red radiation, ultrasonic, or induction heating. The speed at which one can heat the surfaces to be joined to the proper temperature for joining often determines the speed at which one can heat-seal the surfaces. High-speed heat-sealing is important because many such operations are high-volume, continuous operations where slow heat-sealing speeds significantly increase costs. In many cases, the seal which is formed between the surfaces to be sealed is put under load while it is still warm. This means that the hot-tack properties of the polyethylene are crucial to ensure a strong seal is formed even before cooling.

But not only the hot tack strength should be rather high but also the heat sealing initiation temperature should be rather low. By operating at lower temperature there is the benefit that the article to be sealed is not exposed to high temperature. There are also economic advantages since lower temperatures are of course cheaper to generate and maintain.

Thus, a low density polyethylene which can be extruded without additives while retaining the original MFR of the resin during the extrusion coating process and which has a high hot tack force in combination with a low sealing initiating temperature (SIT) in the subsequent heat sealing step is desirable.

Accordingly the object of the present invention is to provide a low density polyethylene (LDPE) which can be used in the extrusion coating process without affecting the adhesion properties at high process speeds and which can be extruded without additives while retaining the melt flow rate and which has a high hot tack force and a low sealing initiating temperature (SIT) in the subsequent heat sealing step.

Figure 1:
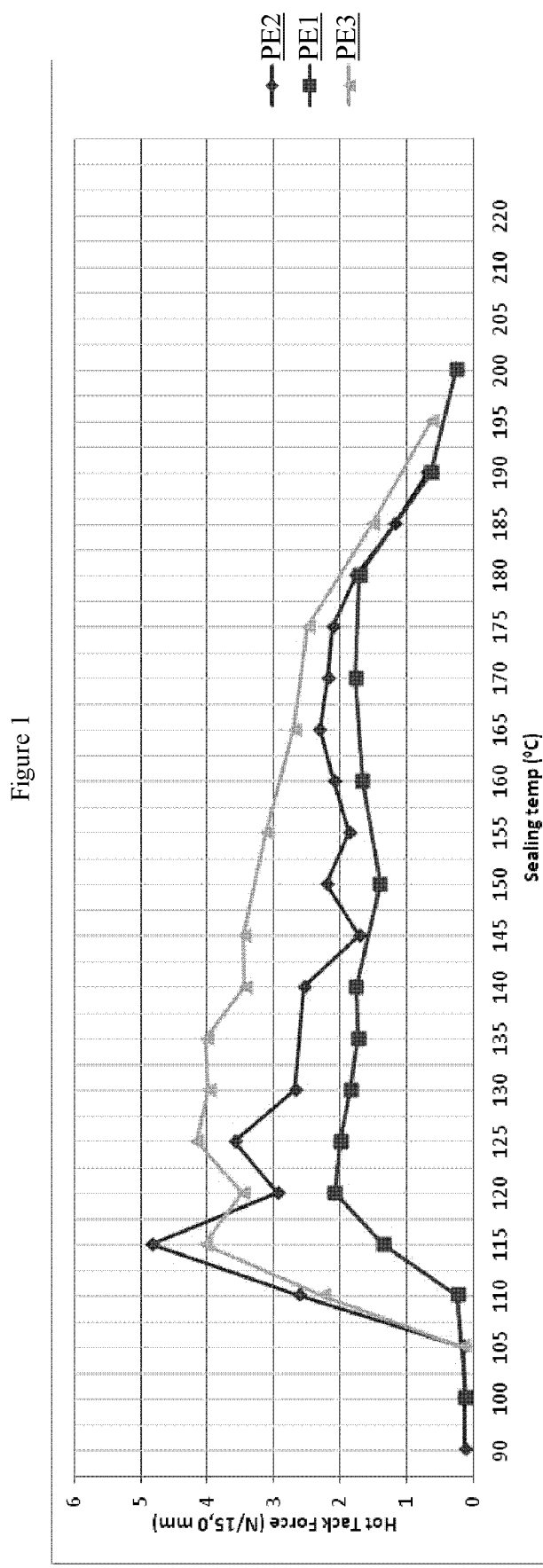
FIG. 1 illustrates seal temperature in hot tack testing of PE1, PE2, and PE3 with a line speed of 100 m/min and a coating weight of 20 g/m² on UG kraft paper.

Therefore, the present invention provides in a first embodiment the use of a at least a part of a polymer layer comprising a composition (Co), the composition comprising a low density polyethylene (LDPE), preferably a low density homopolymer of ethylene (LDPE homopolymer), produced in a tubular reactor which composition is free of additives as a thermoplastic surface of an extrusion coated structure comprising the polymer layer and a first substrate for preparing heat-sealed articles by heat-sealing of said thermoplastic surface with a second substrate.

The present invention provides in a second embodiment the use of a at least a part of a polymer layer comprising a composition (Co), the composition comprising a low density polyethylene (LDPE), preferably a low density homopolymer of ethylene (referred herein as LDPE homopolymer), having
  a melt flow rate (MFR) according to ISO 1133 (190° C., 2.16 kg) higher than 3.0 g/10 min;
  a molecular weight distribution Mw/Mn which is greater than 10; and
  a vinylidene content which is at least 15/100 k C;
which composition is free of additives as a thermoplastic surface of an extrusion coated structure comprising the polymer layer and a first substrate for preparing heat-sealed articles by heat-sealing of said thermoplastic surface with a second substrate.

Through the invention the low density polyethylene (LDPE) is preferably a low density homopolymer of ethylene (LDPE homopolymer).

Preferably, in the first embodiment the low density polyethylene (LDPE) produced in a tubular reactor is having
  a melt flow rate (MFR) according to ISO 1133 (190° C., 2.16 kg) higher than 3.0 g/10 min;
  a molecular weight distribution Mw/Mn which is greater than 10; and
  a vinylidene content which is at least 15/100 k C.

Preferably, in the second embodiment the low density polyethylene (LDPE) has been produced in a tubular reactor.

Unless otherwise explicitly mentioned to the contrary in the following preferred features of both of the afore-mentioned embodiments are described.

In the extrusion coated substrate the polymer layer is extrusion coated onto the substrate.

Preferably, the polymer layer is free of additives.

The present invention is further directed to a process comprising the following steps in the given order:
a) preparing a low density polyethylene (LDPE) according to any one of the embodiments of the present invention;
b) preparing a composition (Co) comprising the low density polyethylene (LDPE) obtained in step a); and
c) extrusion coating a polymer layer comprising composition (Co) obtained in step b) onto a first substrate;
whereby
no additives are present in the composition or added to the composition or any of its ingredients before or during steps a) to b) are effected
d) heat sealing a first thermoplastic surface which is at least a part of the polymer layer obtained in step c) with a second substrate.

The low density polyethylene (LDPE) preferably is having
  a melt flow rate (MFR) according to ISO 1133 (190° C., 2.16 kg) higher than 3.0 g/10 min;
  a molecular weight distribution Mw/Mn which is greater than 10; and
  a vinylidene content which is at least 15/100 k C
and/or, preferably and
preferably has been produced in a tubular reactor.

Preferably, no additives are present in the composition or added to the composition or any of its ingredients before or during steps a) to c) are effected.

The present invention is further directed to an article wherein a thermoplastic surface has been heat-sealed onto a second substrate, wherein said thermoplastic surface is at least a part of a polymer layer comprising a composition (Co) comprising a low density polyethylene (LDPE) according to any one of the embodiments of the present invention wherein
the composition (Co) does not comprise any additives
whereby the polymer layer is one layer of a coated structure further comprising a first substrate whereby the polymer layer is extrusion coated onto the first substrate prior to heat-sealing.

The low density polyethylene (LDPE) is preferably having
  a melt flow rate (MFR) according to ISO 1133 (190° C., 2.16 kg) higher than 3.0 g/10 min;
  a molecular weight distribution Mw/Mn which is greater than 10; and
  a vinylidene content which is at least 15/100 k C
and/or, preferably and
preferably has been produced in a tubular reactor.

When in the following reference is made to preferred embodiments or technical details of the inventive use, it is to be understood that these preferred embodiments or technical details also refer to the inventive processes as well as to the inventive article described herein unless explicitly mentioned to the contrary.

The substrate to be coated, i.e. the first substrate, can be any substrate known in the art. Preferably the substrate is selected from the group consisting of a fibrous substrate, such as paper, paperboard or Kraft paper; a metal foil, such as aluminum foil; and a plastic film, such as a biaxially oriented polypropylene film, a polyethylene terephthalate (PET) film, a polyamide (PA) film or a cellophane film.

The second substrate may also be any substrate known in the art, including a polymer layer according to the invention or a substrate coated with the polymer layer according to the invention. It maybe the same or different compared with the first substrate. Preferably the second substrate is selected from the group consisting of a polymer layer according to the invention, a fibrous substrate, such as paper, paperboard or Kraft paper; a metal foil, such as aluminum foil; and a plastic film, such as a biaxially oriented polypropylene film, a polyethylene terephthalate (PET) film, a polyamide (PA) film or a cellophane film or one of the afore-mentioned substrates except the polymer layer according to the invention coated with a polymer layer according to the invention.

Thus, of the two surfaces to be heat sealed only one surface maybe a thermoplastic surface being at least a part of a polymer layer comprising the composition (Co) according to the invention. In other words a coated substrate maybe directly heat sealed on the second substrate according to one of the above embodiments.

The second substrate may be and preferably is made from the same material as the first substrate.

The second substrate and the first substrate may also be the same, such as different areas of the same substrate.

This can be accomplished by folding the coated structure comprising the polymer layer such that the polymer layer comes in contact with a different area of the same polymer layer. Therefore, the wording "at least a part" is used in the present invention.

Alternatively the second substrate maybe the same as the first substrate and the substrate is only partially coated with a polymer layer according to the invention. Thereby the polymer layer according to the invention can be sealed with an uncoated area of the same substrate.

The substrate may comprise a seam. Such a seam is especially advantageous in case the substrate should be folded, e.g. as in case of the above embodiments.

Preferably, the first substrate comprises the polymer layer according to the invention and the second substrate is a polymer layer according to the invention or a substrate coated with the polymer layer according to the invention, preferably, a substrate coated with the polymer layer according to the invention.

The second substrate and the first substrate may also be the same, such as different areas of the same substrate.

This can be accomplished by folding the coated structure comprising the polymer layer such that the polymer layer comes in contact with a different area of the same polymer layer as outlined above.

Preferably, two thermoplastic surfaces have been heat-sealed which are each at least parts of one or two polymer layer(s) according to the invention, more preferably, each polymer layers is a layer of a coated structure comprising the polymer layer and a substrate whereby the polymer layer is extrusion coated onto the respective substrate prior to heat-sealing.

Preferably, in the use, process and/or article according to the present invention the polymer layer and/or the composition (Co) has/have a melt flow rate $MFR_2$ (190° C., 2.16 kg, ISO 1133) of at least 2.0 g/10 min, and whereby further the melt flow rate $MFR_2$ (190° C., 2.16 kg, ISO 1133) of the composition (Co) before and after extrusion are substantially the same, i.e.

$$1.5 \geq \frac{MFR_2(\text{after})}{MFR_2(\text{before})} \geq 0.5$$

whereby
MFR (after) is the melt flow rate $MFR_2$ (190° C., 2.16 kg, ISO 1133) of the composition (Co) after extrusion coating;
MFR (before) is the melt flow rate $MFR_2$ (190° C., 2.16 kg, ISO 1133) of the composition (Co) before extrusion coating.

As already outlined above, the term "at least a part" has been used to express that the different areas of the same polymer layer maybe heat-sealed or that not the entire layer is subjected to heat sealing. Different areas of the same polymer layer have identical physical properties.

By using such an LDPE it has been surprisingly found that no or only a negligible drop in the melt flow rate occurs albeit no additives are present. Moreover, the adhesion properties, hot tack strength and seal initiation temperature are further improved compared with autoclave resins having similar melting point.

Prior to heat-sealing, the polymer layer is, thus, one of the outer layers of the coated structure. Outer layer denotes that there is no further layer between the outer layer and the environment. Both outer layers may also be a polymer layer according to the invention.

In the present invention the term "additives" encompasses all inorganic or organic compounds different from polymeric material except the radical initiators used to prepare the low density polyethylene (LDPE) in the reactor, preferably, the tubular reactor. Especially the term "additives" encompasses compounds which influence the oxidation cycle of the polymer and which include compounds which are usually referred to as antioxidants and radical scavengers. Antioxidants are compounds which prevent the polymer of being oxidized and include sterically hindered phenols, sulphur containing antioxidants, aromatic amines and hindered amines. Radical scavengers are compounds which can react with radicals in the polymer. Examples are phosphites and phosphonites and hydroxylamines and amine oxides.

Preferably, the polymer layer does not comprise any additives. In case more than one polymer layer according to the invention is present, preferably all polymer layers do not comprise any additives.

According to the instant invention the terms "polymer layer" and "extrusion coated layer" define the same subject, namely the polymer layer which is extrusion coated on the substrate and thus are interchangeable.

As mentioned above the substrate is extrusion coated and, thus, at least one surface of the substrate is coated. It is however within the scope of the invention that both sides of the substrate, i.e. the outer and inner surface (side) of the substrate is extrusion coated. Accordingly the polymer layer according to this invention is in directed contact with the substrate. The term "direct contact" covers also embodiments in which the polymer layer has been subjected to ozone treatment and the substrate has been subjected to corona treatment or flame treatment, respectively, for improving the adhesion between the polymer layer and the substrate.

The article of the present invention must at least comprise the coated substrate and may consist of one or more, usually not more than three of the coated substrates depending on the end use. Typically the articles are juice cartons, milk cartons and the like. However the articles according to this invention may also flexible packaging and industrial packaging articles, as well as disposable cups, plates and the like. Accordingly in its broadest meaning the instant article is the article wherein two thermoplastic surfaces have been heat-sealed as such.

The polymer layer of the extrusion coated substrate has preferably a thickness in the range of 2 to 1,000 μm, more preferably in the range of 5 to 100 μm. The specific thickness will be selected according to the nature of the substrate, its expected subsequent handling conditions and, most importantly, the subsequent use of the end product. Especially, when the LDPE is as defined in the present invention substantially thinner coatings may be produced. For instance, it is usually not possible to reach 2 μm thickness with autoclave-based LDPE while the LDPE according to the present invention allows producing 2 μm coating without problems. The thickness of the substrate may generally be chosen freely and has no effect on the coating process. It can typically be from 1 to 1,000 μm. e.g. 5 to 300 μm.

The extrusion coating process is preferably carried out using conventional extrusion coating techniques. Hence, the polymer composition (Co) is fed to an extruding device. From the extruder the polymer melt is passed through a flat die to the substrate to be coated. Due to the distance between the die lip and the nip, the molten plastic is oxidized in the air for a short period, usually leading to an improved adhesion between the extrusion coated layer and the substrate. The coated substrate is cooled on a chill roll, after which it is passed to edge trimmers and wound up.

The die width typically depends on the size of the extruder used. Thus with 90 mm extruders the width may suitably be within the range of 600 to 1,200 mm, with 115 mm extruders from 900 to 2,500 mm, with 150 mm extruders from 1,000 to 4,000 mm and with 200 mm extruders from 3,000 to 5,000 mm.

Preferably the line speed (draw-down speed) is 75 m/min or more, more preferably, more than 100 m/min, more preferably more than 300 m/min, and in most commercially operating machines more than 400 m/min or more than 500 m/min. Modern machines are designed to operate at lines speeds of up to 1,000 m/min. Accordingly in one preferred embodiment the line speed (draw-down speed) is of up to 1,500 m/min and preferably up to 1,200 m/min, and therefore the line speed (draw-down speed) is preferably in the range of equal or more than 300 to 1,500 m/min, more preferably in the range of 300 to 1,400 m/min or in the range of 500 to 1,400 m/min, like in the range of 300 to 800 m/min or in the range of 500 to 1,200 m/min.

The temperature of the polymer melt, i.e. of the composition (Co) melt, is typically between 270 and 330° C., like in the range of 275 to 330° C.

It is also possible to employ a coating line with at least two extruders to make it possible to produce multilayered coatings with different polymers. It is also possible to have arrangements to treat the polymer melt exiting the die to improve adhesion, e.g. by ozone treatment, and/or the substrate with corona treatment or flame treatment. For the corona treatment, for instance the substrate is passed between two conductor elements serving as electrodes, with such a high voltage, usually an alternating voltage (about 10000 V and 10000 Hz), being applied between the electrodes that spray or corona discharges can occur. Due to the spray or corona discharge, the air above the substrate surface is ionized and reacts with the molecules of the substrate surface. An overview of the different techniques is given, for instance, by David A Markgraf of Enercon Industries Corporation in http://www.enerconind.com/files/7f/7fb3c045-dee6-461c-b508-2596816d0bf4.pdf (see pages 2 to 8 for flame treatment, 9 to 20 for corona treatment and 20 to 21 for ozone treatment).

According to the instant invention the polymer layer must comprise the composition (Co). Preferably the composition (Co) constitutes the main part of the polymer layer. Accordingly the polymer layer preferably comprises at least 50 wt.-%, more preferably at least 70 wt.-%, still more preferably at least 85 wt.-%, yet more preferably 95 wt.-% or more, still yet more preferably consists of, the composition (Co). Accordingly it is appreciated that the polymer layer comprises 70 to 100 wt.-%, like 70 to 90 wt.-%, more preferably 85 to 100 wt.-%, like 85 to 90 wt.-%, yet more preferably 95 to 100 wt.-%, like 95 to 99 wt.-%, of the composition (Co).

Preferably the polymer layer, has a melt flow rate MFR$_2$ (190° C.) of at least 2.0 g/10 min, more preferably has a melt flow rate MFR$_2$ (190° C.) in the range of 2.0 to 15.0 g/10 min, yet more preferably has a melt flow rate MFR$_2$ (190° C.) in the range of 2.5 to 15.0 g/10 min, still more preferably in the range of 3.5 to 10.0 g/10 min, still yet more preferably in the range of 4.5 to 9.0 g/10 min. As will be readily appreciated by the skilled person, the melt flow rate of the polymer layer applies to layer after extrusion. The same values and ranges apply for the melt flow rate MFR$_2$ (190° C.) of the composition (Co) being part of the polymer layer after the extrusion coating process.

On the other hand the melt flow rate MFR$_2$ (190° C.) of the polymer composition (Co) prior the extrusion coating process may be higher. Accordingly the melt flow rate MFR2 (190° C.) of the polymer composition (Co) prior the extrusion coating process is at least 2.5 g/10 min, more preferably has a melt flow rate MFR$_2$ (190° C.) in the range of 3.5 to 20.0 g/10 min, yet more preferably in the range of 5.0 to 15.0 g/10 min.

One advantage of the present invention is that the melt flow rate MFR$_2$ (190° C.) of the low density polyethylene (LDPE) and thus of the polymer composition (Co) is only little—if at all—effected by the extrusion coating process. Preferably, the melt flow rate MFR$_2$ (190° C.) of the composition (Co) before and after extrusion are substantially the same, i.e.

$$1.5 \geq \frac{MFR_2(\text{after})}{MFR_2(\text{before})} \geq 0.5$$

more preferably $$1.4 \geq \frac{MFR_2(\text{after})}{MFR_2(\text{before})} \geq 0.7,$$

yet more preferably $$1.3 \geq \frac{MFR_2(\text{after})}{MFR_2(\text{before})} \geq 0.8$$

wherein
MFR (after) is the melt flow rate MFR$_2$ (190° C.) of the composition (Co) after extrusion coating;
MFR (before) is the melt flow rate MFR$_2$ (190° C.) of the composition (Co) before extrusion coating.

The polymer composition (Co) according to this invention must comprise a low density polyethylene (LDPE). Accordingly the polymer composition (Co) may comprise further polymers not explicitly mentioned in the instant invention. Therefore, the polymer composition comprises at least 50 wt.-%, more preferably at least 70 wt.-%, yet more preferably at least 80 wt.-%, like 80 to 100 wt.-% or 80 to 90 wt.-%, still more preferably at least 90 wt.-%, like 90 to 99 wt.-% or 90 to 100 wt.-%, of the low density polyethylene (LDPE), wherein the weight percentage is based on the polymer composition. In a preferred embodiment the low density polyethylene (LDPE) is the only polymer in the composition (Co).

In an especially preferred embodiment the polymer layer consists of the low density polyethylene (LDPE).

The low density polyethylene (LDPE) preferably is a low density homopolymer of ethylene (referred herein as LDPE homopolymer).

Generally, the polymerization of the low density polyethylene (LDPE) is performed by reacting the monomers under the action of one or more radical initiators, such as peroxides, oxygen, azo compounds or combinations thereof, at a temperature of about 150 to 350° C. and at a pressure of about 100 to 400 MPa usually and preferably in a tubular reactor. The monomers are normally compressed in several stages up to the desired pressure before introduction into the reactor. The LDPE used according to the invention is preferably produced in a tubular reactor. A tubular reactor typically consists of several hundred meters of jacketed high pressure tubing arranged as a series of straight sections connected by 180° bends. Tubular reactors are either single-feed or multi-feed reactors, including split-feed reactors. In a single-feed tubular reactor (also referred to as front-feed reactor), the total monomer flow is fed to the inlet of the first reaction zone. In a multi-feed tubular reactor, the monomers are fed into the reactor at several locations along the reactor. In a split-feed reactor, the compressed monomer mixture are split into several streams and fed into the reactor at different locations thereof. Reaction is started by injection of the radical initiators. The reaction mixture cools after the first reaction peak and additional initiator is added to start a second reaction zone. The number of initiator injection points determines the number of reaction zones. A tubular reactor for production of ethylene polymers by high pressure radical polymerization usually comprises a total of two to five reaction zones. When the reaction is completed, the temperature and the pressure are lowered, typically in two steps using a high-pressure separator and a low-pressure separator. The resulting polymer is recovered and nonreacted monomers are either removed or recycled back to the reactor. As radical initiators, initiators commonly known in the art may be employed. Further details of the production of ethylene polymers by high pressure radical polymerization can be found for example in the Encyclopedia of Polymer Science and Engineering, Vol. 6 (1986), pp 383-410.

Suitable tubular technologies/processes are well known in the art. Examples are LyondellBasell Lupotech® T, SABTEC CTR® tubular LDPE technology, ExxonMobil Chemical's high pressure tubular process or DSM's 'Clean Tubular Reactor Technology'.

The meaning of low density polyethylene (LDPE) is well known and documented in the literature. Although the term LDPE is an abbreviation for low density polyethylene, the term is understood not to limit the density range, but covers the LDPE-like HP polyethylenes, which are produced by free-radical polymerization in a high-pressure process, with low, medium and higher densities. The term LDPE describes and distinguishes only the nature of HP polyethylene with typical features, such as different branching architecture, compared to the polyethylene produced in the presence of an olefin polymerization catalyst. Moreover, said low density polyethylene (LDPE), preferably the low density polyethylene (LDPE) homopolymer, may be unsaturated.

In case the low density polyethylene (LDPE) is a copolymer it comprises typical comonomers, like acrylates, methacrylates, non-conjugated dienes, vinylsilanes and acetates.

As already outlined above, the low density polyethylene of the present invention has preferably been produced in a tubular reactor by radical initiated polymerization where the polymerization is performed by reacting the ethylene monomers under the action of one or more radical initiators, such as peroxides, oxygen or combinations thereof The polyethylenes of the present invention are preferably produced according to the processes disclosed in WO-A-2013/083285 and WO-A-2103178242. By using the above-mentioned processes we have surprisingly been able to produce a low density polyethylene showing advantageous properties. Thus, for example, the storage modulus G' at loss modulus G"=5 kPa has shown to be generally higher for the low density polyethylene of the present invention than standard tubular materials (low density polyethylenes) produced with conventional techniques. The new low density polyethylene of the present invention exhibits advantageous processability properties, e.g. improved extrusion coating properties compared to a regular tubular material.

A low density polyethylene which is produced in a tubular reactor will have a molecular weight distribution without the pronounced high molecular weight tail present in autoclave materials. This difference in the appearance of the molecular weight distribution is expected and detectable to a person skilled in the art.

The low density polyethylene of the present invention is a polyethylene preferably, having a density in the interval of 910 to 940 kg/m$^3$, more preferably in the interval of 910 to 935 kg/m$^3$.

Further, the low density polyethylene of the present invention preferably has a molecular weight distribution Mw/Mn which is greater than 11 and most preferably greater than 12. Usually $M_w/M_n$ will be lower than 28, preferably lower than 26.

Mn is the number average molecular weight and Mw is the weight average molecular weight. Mw and Mn are determined according to methods known in the art of Gel Permeation Chromatography (GPC). For branched materials the average molecular weight is determined by the aid of light scattering since the branched structure do not elute according to molecular weight as for linear materials. The molecular weight distribution Mw/Mn, which is also called MWD or PDI (polydispersity index), is a key parameter for extrusion coating properties.

Further, the low density polyethylene of the present invention preferably has a storage modulus G' (5 kPa), measured at a loss modulus G" of 5 kPa, which is above 3000 Pa and more preferable above 3250 Pa. Usually the afore-mentioned storage modulus will be lower than 3900 Pa.

Zero shear-rate viscosity $\eta_0$ is typically from 3000 to 6000 Pas, preferably from 4000 to 6000 Pas, more preferably 4500 to 6000 Pas.

Further, the low density polyethylene of the present invention preferably has a vinylidene content which is at least 20/100 k C, yet more preferably of at least 25/100 k C and most preferably of at least 28/100 k C.

Further, suitable upper vinylidene content limits of vinylidene content intervals may be 38, 36 or alternatively 34, and these upper vinylidene content limits may each be used in any vinylidene content interval, open or closed, as described herein, i.e. used in combination with the given lower vinylidene content limit of any vinylidene content interval, as described herein.

Vinylidene is formed by beta-scission of tertiary carbon radicals. With increased branching by higher radical initiator amount, the number of tertiary carbon radicals will increase and also the probability of beta-scission and creation of a vinylidene. The vinylidene content will then be an indirect measurement on the amount of introduced branches in the low density polyethylene of the present invention.

The branching originates from radical transfer to the polymer backbone. These transfer reactions are necessary for differentiation of the molecular weights between the chains, propagation leading to long-chain branching or termination via combination leading to two chains is merged into one. The introduction of long chain branching and high molecular weight material, make the material, here the low density polyethylene, exhibiting entanglements in the melt which leads to higher melt strength (reduced neck-in).

Preferably, the low density polyethylene of the present invention has a melt flow rate (MFR) according to ISO 1133 (190° C., 2.16 kg) from 3.5 to 15 g/10 min and most preferably from 4.0 to 7.0 g/10 min.

Preferably the low density ethylene polymer has a weight average molecular weight, Mw, of from 40000 to 250000 g/mol, more preferably from 47000 to 240000 g/mol.

The composition (Co) in accordance with the present invention may be prepared by compounding the components within suitable melt mixing devices for preparing polymeric compounds, including in particular extruders, like single screw extruders as well as twin screw extruders. Other suitable melt mixing devices include planet extruders and single screw co-kneaders.

More than two surfaces may be sealed together, for example, a coated structure may be sealed together with two or more substrates such as the second substrate according to the present invention.

Preferably, all the surfaces being sealed are of the polymer layer as described herein. Preferably the heating of the areas to be sealed is done by thermal conduction from a hotter material (e.g., sealing bar(s) or roller(s)), by microwave heating, dielectric heating, ultrasonic, etc.).

The amount of pressure used may vary from that needed to contact the two (or more) surfaces to be sealed, for example finger pressure to pressure applied by presses or rollers, e.g., up to about 3 MPa of sealing bar. The heating may be before, or simultaneous with the application of pressure. Although pressure may be applied before heating, it will normally not be effective until the heating is carried out.

The temperature of the heat-sealable polyethylene sealing surface, which is being sealed, will generally be above the glass transition temperature Tg. Since much of the heat-sealing done commercially is on high-speed lines, the lower the temperature needed to give a seal of sufficient strength, the faster the line may often run, since it will take less time to heat the sealing surface to the required temperature.

Usually the heat sealing is carried out at temperatures from 90 to 200° C., preferably, from 105 to 150° C. and more preferably from 105 to 130° C.

Usually the heat sealing is carried out at a pressure from 0.5 to 3 MPa.

Furthermore it is preferred that the polymer layer in any of the above embodiments has a heat sealing initiation temperature (SIT) of not more than 125° C., more preferably in the range of 100 to 120° C., yet more preferably in the range of 102 to 118° C.

EXAMPLES

1. Measuring Methods

The following definitions of terms and determination methods apply for the above general description of the invention as well as to the below examples unless otherwise defined.

Molecular Weights, Molecular Weight Distribution (Mn, Mw, MWD)—GPC

A PL 220 (Agilent) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. All samples were prepared by dissolving 8.0-12.0 mg of polymer in 10 mL (at 160° C.) of stabilized TCB (same as mobile phase) for 2.5 hours for PP or 3 hours for PE at 160° C. under continuous gentle shaking. The injected concentration of the polymer solution at 160° C. (c160° C.) was determined in the following way.

$$c_{160°C.} = \frac{w_{25}}{V_{25}} * 0.8772$$

With: $w_{25}$ (polymer weight) and $V_{25}$ (Volume of TCB at 25° C.).

The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm³/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SECSoftware Version 3.2. The molecular weight was calculated using the option in the Cirrus software "use LS 15 angle" in the field "sample calculation options subfield slice MW data from". The dn/dc used for the determination of molecular weight was calculated from the detector constant of the RI detector, the concentration c of the sample and the area of the detector response of the analysed sample.

This molecular weight at each slice is calculated in the manner as it is described by by C. Jackson and H. G. Barth (C. Jackson and H. G. Barth, "Molecular Weight Sensitive Detectors" in: Handbook of Size Exclusion Chromatography and related techniques, C.-S. Wu, $2^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted. Molecular weight averages ($M_z$, $M_w$ and $M_n$), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i / M_i)} \quad (3)$$

For a constant elution volume interval $\Delta V_i$, where Ai and Mi are the chromatographic peak slice area and polyolefin molecular weight (MW) determined by GPC-LS.

Dynamic Shear Measurements (Frequency Sweep Measurements)

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where
$\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus G', the shear loss modulus, G", the complex shear modulus, G*, the complex shear viscosity, $\eta$*, the dynamic shear viscosity, $\eta$', the out of-phase component of the complex shear viscosity $\eta$" and the loss tangent, tan $\delta$ which can be expressed as follows:

$$G' = \frac{\sigma_0}{\gamma_0}\cos\delta \ [Pa] \quad (3)$$

$$G'' = \frac{\sigma_0}{\gamma_0}\sin\delta \ [Pa] \quad (4)$$

$$G^* = G' + iG'' \ [Pa] \quad (5)$$

$$\eta^* = \eta' - i\eta'' \ [Pa.s] \quad (6)$$

$$\eta' = \frac{G''}{\omega} \ [Pa.s] \quad (7)$$

$$\eta'' = \frac{G'}{\omega} \ [Pa.s] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (9).

$$EI(x)=G' \ for \ (G''=x \ kPa) \ [Pa] \quad (9)$$

For example, the EI(5 kPa) is the defined by the value of the storage modulus G', determined for a value of G" equal to 5 kPa.

The Zero Shear Rate Viscosity $\eta_0$ is Calculated as Follows:
The functions f' and f" are defined as follows:

$$f'(\omega)=G''(\omega)*\omega/[G'(\omega)^2+G''(\omega)^2]$$

and $$f''(\omega)=G'(\omega)*\omega/[G'(\omega)^2+G''(\omega)^2]$$

A plot of f' versus f" is made by plotting the points of f' corresponding to five lowest measured frequencies against the respective points of f" (f' on the y-axis, f" on the x-axis). The best-fitting straight line is then drawn through the points and the line is extrapolated to f"=0. The zero shear rate viscosity is then taken as the reciprocal of the intercept value, i.e., $\eta_0=1/f'(f''=0)$.

References

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11$^{th}$ (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995).
[3] Definition of terms relating to the non-ultimate mechanical properties of polymers, Pure & Appl. Chem., Vol. 70, No. 3, pp. 701-754, 1998.

Quantification of Microstructure by NMR Spectroscopy

Quantitative nuclear-magnetic resonance (NMR) spectroscopy was used to quantify the content of unsaturated groups present in the polymers. Quantitative 1H NMR spectra recorded in the solution-state using a Bruker Advance III 400 NMR spectrometer operating at 400.15 MHz. All spectra were recorded using a 13C optimized 10 mm selective excitation probehead at 125° C. using nitrogen gas for all pneumatics.

Approximately 200 mg of material was dissolved in 1,2-tetrachloroethane-d2 (TCE-d2) using approximately 3 mg of Hostanox as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups. {he10a, busico05a} All chemical shifts were internally to the signal resulting from the residual protonated solvent at 5.95 ppm.

Characteristic signals corresponding to the presence of terminal vinyl groups (R—CH=CH2) were observed and the amount of vinylidene groups quantified using the integral of the coupled terminal Va and Vb protons at 4.95, 4.98 and 5.00 and 5.05 ppm respectively accounting for the number of reporting sites per functional group:

$N$vinyl=($I$Va+$I$Vb)/2

The content of vinyl groups was calculated as the fraction of vinyl group in the polymer with respect to the total number of carbons present:

$U$vinyl=$N$vinyl/$C$total

Characteristic signals corresponding to the presence of internal vinylidene groups (RR'C=CH2) were observed and the amount of vinylidene groups quantified using the integral of the two D terminal protons at 4.74 ppm accounting for the number of reporting sites per functional group:

$N$vinylidene=$I$D/2

The content of vinylidene groups was calculated as the fraction of vinlylidine group in the polymer with respect to the total number of carbons present:

$U$vinylidene=$N$vinylidene/$C$total

Characteristic signals corresponding to the presence of internal cis-vinylene groups (ERCH=CHR') were observed and the amount of cis-vinylene groups quantified using the integral of the two C protons at 5.39 ppm accounting for the number of reporting sites per functional group:

$N$cis=$I$C/2

The content of cis-vinylene groups was calculated as the fraction of cis-vinlylene group in the polymer with respect to the total number of carbons present:

$U$cis=$N$cis/$C$total

Characteristic signals corresponding to the presence of internal trans-vinylene groups (Z—RCH=CHR') were observed and the amount of trans-vinylene groups quantified using the integral of the two T protons at 5.45 ppm accounting for the number of reporting sites per functional group:

$N$trans=$I$T/2

The content of trans-vinylene groups was calculated as the fraction of trans-vinlylene group in the polymer with respect to the total number of carbons present:

$U$trans=$N$trans/$C$total

The total amount of carbon was calculated from the bulk aliphatic integral between 2.85 and −1.00 accounting for the number of reporting nuclei and compensation for sites relating to unsaturation not including in this region:

$$C\text{total}=(1/2)*(I\text{aliphatic}+N\text{vinyl}+N\text{vinylidene}+N\text{cis}+N\text{trans})$$

The total amount of unsaturated group was calculated as the sum of the individual observed unsaturated groups and thus also reported with respect to the total number of carbons present:

$$U\text{total}=U\text{vinyl}+U\text{vinylidene}+U\text{cis}+U\text{trans}$$

The unsaturation content is given as amount of unsaturated group/100 kC where 100 kC means 100000 carbons.

The relative content of a specific unsaturated group (x) is reported as the fraction or percentage of a given unsaturated group with respect to the total amount of unsaturated groups:

$$[Ux]=Ux/U \text{ total}$$

References he10a
He, Y., Qiu, X, and Zhou, Z., Mag. Res. Chem. 2010, 48, 537-542.
busico05a
Busico, V. et. al. Macromolecules, 2005, 38 (16), 6988-6996

Melt Flow Rate (MFR)

The melt flow rates are measured with a load of 2.16 kg ($MFR_2$) at 190° C. The melt flow rate is that quantity of polymer in grams which the test apparatus standardised to ISO 1133 extrudes within 10 minutes at a temperature of 190° C. under a load of 2.16 kg.

The MFR of the coating layer was determined as follows:

The coating layer was ripped off the substrate and collected. Then, the coating was cut into little pieces using scissors and the pieces were put into an automatic press. The automatic press was used for removing the air from the sample. In the automatic press, the pieces of polymer film melted and formed a sample plate. The plate (devoid of bubbles) was then cut into small pieces and these pieces were used for MFR measurement as discussed above. Manufacturing sample plates with the automatic press was done according to ISO 293.

Density

Low density polyethylene (LDPE): The density was measured according to ISO 1183-2. The sample preparation was executed according to ISO 1872-2 Table 3 Q (compression moulding).

Draw down speed DD (10 $g/m^2$) was determined by keeping the coating weight constant (10 $g/m^2$) during the testing period. The starting line speed was 100 m/min and it was increased stepwise with steps of 100 m/min in five seconds time until the film breaks or 600 m/min was reached.

Neck-in was determined as the difference between the width of the die opening and the width of the coating on the substrate.

The adhesion test is made for evaluating the adhesion between the substrate and the coating. The coating and the substrate were manually torn from each other. Same operator tested the samples of the comparative example and the example. A ranking from 1 to 5 was given as follows:

1 The coating peels very easily from the substrate. The coating does not tear the substrate at all when separated.
2 The coating can be separated from the substrate easily but parts of the substrate follow with the separated coating.
3 The coating is adhered almost completely to the substrate but can still be peeled off from small areas.
4 The coating is adhered well to the substrate. It may be possible by slow tearing to remove the coating from small areas.
5 It is not possible to separate the coating and the substrate. Attempts will result in tearing of the substrate.

Hot Tack Force:

The maximum hot tack force, i.e. the maximum of a force/temperature diagram is determined and reported.

Hot tack measurements were made with J&B hot tack tester following the method ASTM F 1921. The standard requires that the samples have to be cut into 15 mm slices in width. The samples are placed into the hot tack testing machine in vertical direction both ends attached to a mechanical lock. Then the tester seals and pulls out the hot seal and the resisting force is measured.

Sealing pressure, $N/mm^2$ 1.5
Sealing time, s 0.5
Cooling time, s 0.2
Peel speed, mm/s 200

Hot tack of each sample was established by testing hot tack forces with temperatures ranging from 90° C. to temperature where the measured hot tack force was below 1 N. The standard requires at least 3 parallel measurements to be done. The temperature was increased in steps of 10° C.

Examples

PE1 is the commercial low density polyethylene (LDPE) CA7230 of Borealis AG having a density of 923 $kg/m^3$ and a melt flow rate $MFR_2$ (190° C.) of 4.5 g/10 min. It further had $\eta_0$ of 4600 Pas.

PE2 is the commercial low density polyethylene (LDPE) CA8200 of Borealis AG having a density of 920 $kg/m^3$ and a melt flow rate $MFR_2$ (190° C.) of 7.5 g/10 min. It further had $\eta_0$ of 2600 Pas.

PE1 and PE2 were produced using an autoclave reactor.

PE3 is an LDPE produced in a tubular reactor having a density of 918 $kg/m^3$ and a melt flow rate $MFR_2$ (190° C., 2.16 kg, ISO 1133) of 5.7 g/10 min. It further has Mw of 203000 g/mol, a vinylidene content of 32/100 k C, an Mw/Mn of 14.5, G'(G"=5 kPa) of 3500 Pa and $\eta_0$ of 5200 Pas. It has been produced as described for Material A of WO-A-2013178242.

MFR Drop

The above polymers PE1 to PE3 have been subjected to extrusion coating at a line speed of 100 m/min and a coating weight of 20 $g/m^2$ at the temperatures given in the below table and the $MFR_2$ (190° C., 2.16 kg load) [g/10 min] has been determined. The results are shown in the following table.

|  | PE1 | PE2 | PE3 |
|---|---|---|---|
| Pellet reference, prior to extrusion coating | 4.63 | 7.83 | 5.48 |
| Extrusion coating at 300° C. | n.d. | 4.93 | 4.53 |
| Extrusion coating at 320° C. | 2.99 |  | 5.55 | n.d. = not determined

Adhesion Properties

Coatings having a coating weight of 30 $g/m^2$ were applied at a line speed of 100 m/min onto UG kraft paper at the temperatures indicated in the table below and the adhesion properties were determined as outlined above.

| T [° C.] | PE2 | PE3 |
|---|---|---|
| 285 | 1 | 1.5 |
| 295 | 1.5 | 2.5 |
| 305 | 2.5 | 3 |
| 315 | 3 | 3 |

In a second test coatings having a coating weight of 30 g/m² were applied at a line speed of 100 m/min at 315° C. on the substrates indicated in the table below

|  | PE2 | PE3 |
|---|---|---|
| Aluminium laminate | 2.5 | 3 |
| Polyamide | 1.5 | 1.5 |
| OPP | 1 | 1 |
| PET | 1.5 | 1.5 |
| Paper | 4 | 4 |
| Clay coated board | 2 | 3 |

Thus the inventive article shows improved adhesion properties.

Figure 2:
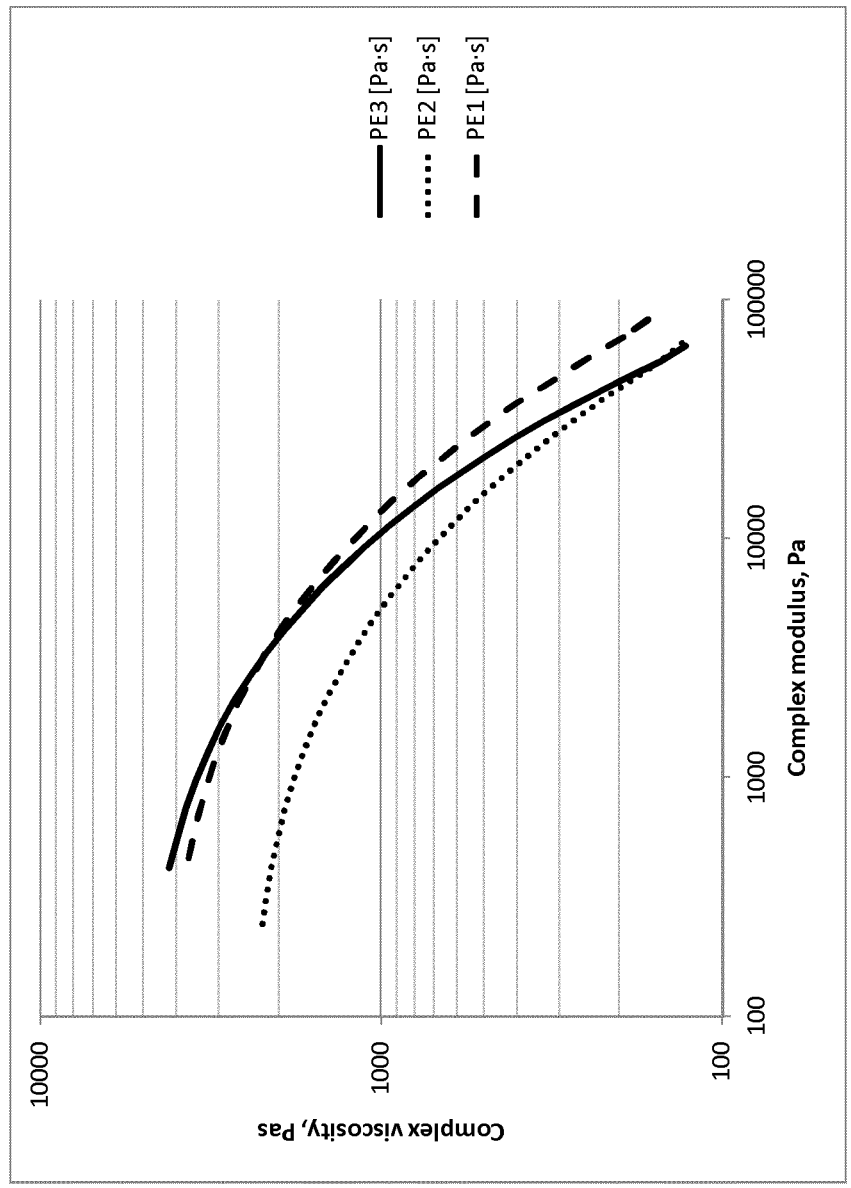
FIG. 2 illustrates the complex viscosity vs complex modulus of PE1, PE2, and PE3 measured during dynamic shear testing.
Figure 3:
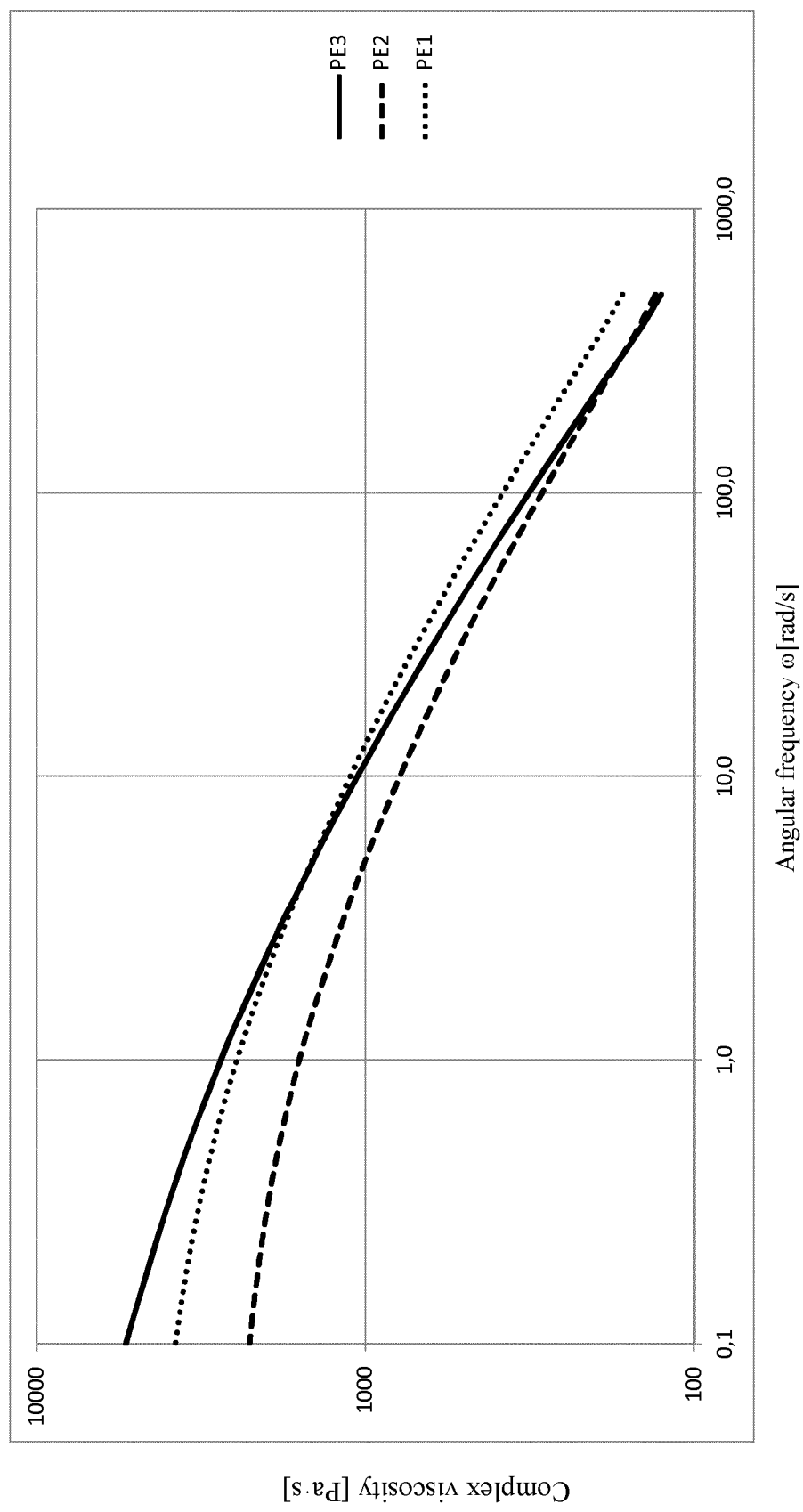
FIG. 3 illustrates the complex viscosity vs angular frequency of PE1, PE2, and PE3 measured during dynamic shear testing with the oscillatory shear tests being done at 190° C. applying a frequency range between 0.001 and 600 rad/s and a setting gap of 1.3 mm.

The seal initiation temperature in hot tack testing has been determined and the result is shown in FIG. 1. Line speed was 100 m/min and coating weight 20 g/m² on UG kraft paper. PE3 also shows a higher zero shear viscosity, i.e. reduces the amount of melt escaping away from under the sealing bars. The results are shown in FIGS. 2 and 3.

PE3 has the same DSC melting point as PE1, i.e. 110° C.

As can be seen from the figure the seal initiation temperature in hot tack testing of PE3 is significantly higher compared with PE1 albeit the DSC melting point is identical.

Further, the seal initiation temperature of PE3 is similar compared with PE2 albeit the higher melting point (110° C. ⇔ 108° C.). Moreover, the adhesion properties of PE3 are significantly improved compared with PE2 albeit the seal initiation temperature is similar.

The invention claimed is:

1. An article including a thermoplastic surface heat-sealed onto a second substrate, wherein said thermoplastic surface is at least a part of a polymer layer comprising a composition (Co) comprising a low density homopolymer of ethylene (LDPE homopolymer),
wherein the polymer layer is free of additives,
whereby the polymer layer is one layer of a coated structure further comprising a first substrate whereby the polymer layer is extrusion coated onto the first substrate prior to heat-sealing, wherein heat-sealing is done by applying heat to the thermoplastic surface and the second substrate to soften or melt the thermoplastic surface and the second substrate while applying pressure where the thermoplastic surface and the second substrate are to be joined,
wherein the thermoplastic surface has been heat-sealed onto the second substrate by a process comprising the following steps in the given order:
a) preparing a low density homopolymer of ethylene (LDPE homopolymer);
  a1) wherein the low density homopolymer of ethylene (LDPE homopolymer) is produced in a tubular reactor and
  a2) wherein the low density homopolymer of ethylene (LDPE homopolymer) has:
    i) a melt flow rate (MFR) according to ISO 1133 (190° C., 2.16 kg) higher than 3.0 g/10 min;
    ii) a molecular weight distribution Mw/Mn which is greater than 10, and
    iii) a vinylidene content which is at least 15 / 100k C;
b) preparing a composition (Co) comprising low density homopolymer of ethylene (LDPE homopolymer) obtained in step a), wherein the low density polyethylene (LDPE) is the only polymer in the composition (Co); and
c) extrusion coating a polymer layer comprising at least 95 wt.% of the composition obtained in step onto a first substrate;
whereby no additives are present in the composition or added to the composition or any of its ingredients before or during steps a) to b) are effected; and
d) heat-sealing a first thermoplastic surface which is at least a part of the polymer layer obtained in step c) with a second substrate.

2. The article of claim 1, wherein step c) is carried out at a temperature of 275 to 330° C.

3. The article of claim 1, wherein step d) is carried out at a temperature of 100 to 200° C.

* * * * *